United States Patent

Wall

Patent Number: 5,230,158
Date of Patent: Jul. 27, 1993

[54] MEASURING TAPE

[76] Inventor: Edward M. Wall, 3527 Sanctuary Blvd., Jacksonville Beach, Fla. 32250

[21] Appl. No.: 6,645

[22] Filed: Jan. 21, 1993

[51] Int. Cl.⁵ .............................................. G01B 3/02
[52] U.S. Cl. ...................................... 33/759; 33/494; 33/DIG. 16
[58] Field of Search ............... 33/416, 417, 494, 476, 33/486, 487, 492, 755, 759, DIG. 16, 760, 764

[56] References Cited

U.S. PATENT DOCUMENTS

| | | | |
|---|---|---|---|
| Re. 11,450 | 10/1894 | Steck | 33/486 |
| 1,178,710 | 4/1916 | Forsberg | 33/476 |
| 1,196,519 | 8/1916 | Caylor | 33/476 |
| 1,643,166 | 9/1927 | Martin | 33/759 |
| 3,289,305 | 12/1966 | Norton | 33/759 |
| 4,200,990 | 5/1980 | West | 33/476 |

Primary Examiner—William A. Cuchlinski, Jr.
Assistant Examiner—Alvin Wirthlin
Attorney, Agent, or Firm—Thomas C. Saitta

[57] ABSTRACT

A tape measure for use with roof framing members is disclosed, the tape measure having a true distance scale having true distance indicia indicating feet, inches and fractions of inches, and one or more secondary false distance scales having false distance indicia corresponding to the true distance indicia, where the actual distances between false distance indicia is the true distance between the true distance indicia multiplied by a predetermined pitch factor. The false distance indicia allow direct marking of the proper rafter lengths for common, hip, valley and jack rafters for a given pitch roof after measurement of the run distance using the true distance scale, without need of calculation or of knowledge of the actual rafter length.

7 Claims, 2 Drawing Sheets

MEASURING TAPE

BACKGROUND OF THE INVENTION

This invention relates generally to measuring tapes used to determine the proper lengths for roof framing members to be cut when framing roofs. More particularly, the invention relates to such tapes which provide secondary scales for determining the length of common rafters, hip rafters, valley rafters, jack rafters and the rise height. Even more particularly, the invention relates to such tapes where the secondary scales provide indicia means for directly marking the proper length of the appropriate rafters to be cut, without requiring further manipulation, calculation, or reference to a pre-calculated table by the user.

When constructing a roof, sloping frame members known as rafters provide the supporting framework. The common rafters slope from the exterior wall top plate to the face of the roof ridge. Common rafters are attached at right angles to the top plate and the ridge member. Where two sloped roofs meet at an inside corner, a valley rafter runs between the two roofs from the top plate to the junction of the two ridge members. Where a hip roof forms part of the roof, a hip roof referring to a roof construction having a sloped end as well as sloped sides, formed when two adjacent sloping roof sides meet, hip rafters slope from the top plate corners to the ridge. Hip jack rafters join the top plate to the hip rafter, and valley jack rafters join the ridge to the valley rafter. Determining the proper length of the common, valley, hip and jack rafters requires use of the Pythagorean theorem. To determine the proper length for a common rafter, for example, the horizontal distance from the point beneath the outer face of the ridge member to the top plate is determined, the vertical distance beneath the ridge is determined, and then the particular rafter length is calculated. Such calculations are typically beyond the ability of construction workers or are overly time consuming, so printed tables containing previously calculated values for various roof pitches are usually consulted to ascertain the proper length to cut the rafters. To determine proper lengths for the hip, valley and jack rafters, the calculations are even more complicated, and again reference tables must be consulted.

Various devices have been conceived in attempts to provide a measuring tape which can be used to determine proper roof framing member lengths without having to consult tables on site. For example, an early attempt by Dahmer is shown in U.S. Pat. No. 499,621. This device is a scale in the nature of a slide rule and is essentially a table in a non-paper format. The run of the rafter, the horizontal distance, is determined by measurement with a standard measuring rule and a slide is positioned at the appropriate corresponding indicia on the central scale. Values for the common, hip or valley rafters are then read from one of the other scales. This value is then measured out on the board to be cut using a regular tape measure. This device is not very precise and requires proper alignment of the slide to insure a correct end result.

Martin in U.S. Pat. No. 1,643,166 shows a device in which incorporates tables on the back of a conventional measuring tape. This device requires the worker to properly read and compute from the tables the proper length for the rafter to be cut. As in the Dahmer device, this is merely a new format for a table and still requires calculations by the worker.

Norton in U.S. Pat. No. 3,289,305 shows a measuring tape which incorporates a slide and curved pitch lines. This device requires the worker to memorize several steps for determining correct lengths, as the device also utilizes a number of scales, marking indicia and movement of the slide. These steps are complicated and provide ample opportunity for error.

It is an object of the invention to provide a measuring tape device for correctly determining proper rafter lengths for common, hip, valley, hip jack and valley jack rafters, which does not require the use of tables, calculations or manipulation of slides.

It is an object to provide such a device which indicates the proper rafter lengths without need for any other equipment or tapes.

It is an object to provide such a device where the indicia for correctly marking the rafter board to be cut are physically located on the tape at the actual distance from the tape end where the board is to be cut, whereby the proper length can be marked directly onto the board.

SUMMARY OF THE INVENTION

The invention is a measuring tape, preferably of the type which is self-retracting into a housing, for determining the proper length of roof framing members to be cut when framing a roof. The device in its preferred embodiment is applicable to common rafters, hip and valley rafters, and hip jack and valley jack rafters, and can be used to determine the proper rise for a given pitch. The device comprises four separate scales, with all four scales having a common starting or zero point at the free end of the tape. One scale is a true distance scale with indicia setting forth the feet, inches, and fractions in the conventional manner using lines of varying length and numbers.

The other three scales are false distance scales and are used for determining the correct length of the rafters which are to be cut. One false scale is utilized for marking the correct length for a common rafter, hip jack rafter or valley jack rafter. The second false scale is utilized for marking a hip or valley rafter length. The third false scale is utilized to determine the proper rise height for a given pitch. The indicia on the three false scales correspond to the indicia for the true distance scale, but the distances between indicia on a given false scale is not equal to the true distance between the corresponding indicia on the true scale. The difference between the distances is determined by a multiplication factor inherent to a particular roof pitch, as determined by applying the Pythagorean theorem and other necessary calculations.

To determine the correct length for a rafter, the worker determines the rafter run, which is the horizontal distance covered by the particular rafter member, using the true distance scale. With this measurement determined in feet, inches and fractions of an inch - for example, 12 feet, 9 and ½ inches - the worker then chooses the proper false scale for the particular rafter, places the tape on the board to be cut and marks the board at the corresponding 12 feet, 9 and ½ inches indicia of the false scale. The actual length of the board thus marked will not be 12 feet, 9 and ½ inches, but will be the necessary actual length for the particular rafter having a run of 12 feet, 9 and ½ inches.

DETAILED DESCRIPTION OF THE INVENTION

Figure 1:
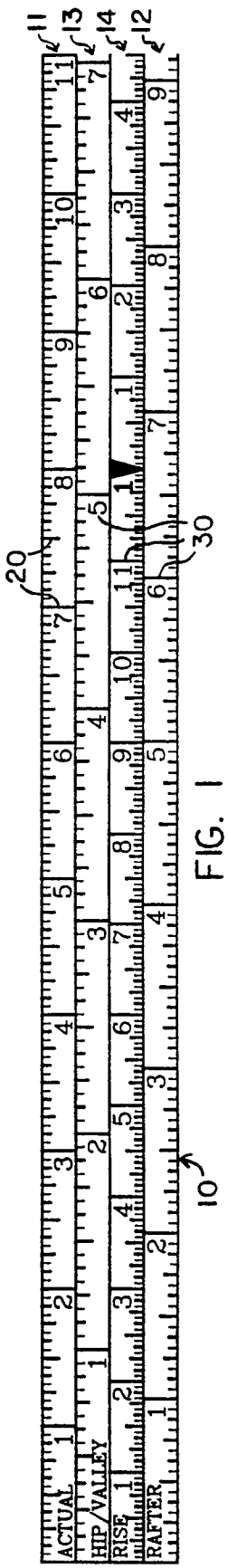
FIG. 1 is a portion of the device calculated for an 8/12 pitch showing the initial segment of the device beginning at the zero point.
Figure 2:
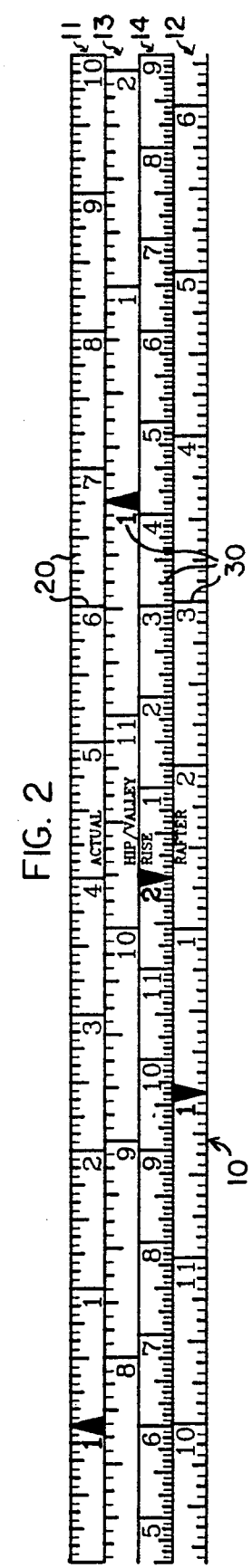
FIG. 2 is the next segment of the device immediately following the segment of FIG. 1.

With reference now to the figures, the preferred embodiment and best mode of the invention will now be disclosed. The invention is a measuring and indicator device for determining and marking for cutting the correct length of common rafters, hip rafters, valley rafters, hip jack rafters and valley jack rafters, as well as determining the proper rise needed for a particular pitch roof. The device comprises a long tape, preferably metal or a material exhibiting like properties and preferably connected to a retracting mechanism in a housing which allows easy retrieval and storage of the tape when not in use. Such a construction for measuring tapes is well known in the industry, with the retracting means being self-actuating or user operated. The tape may have a flange, clip or loop on the free end, of a type known in the industry, to maintain the tape in position during extension and measurement.

Construction of a roof requires building a support framework which comprises a number of rafters which run from a ridge member or a hip rafter to the top plate of the wall, or from a valley rafter to a ridge member. Common rafters are typically set at two foot intervals and slope downward at right angles on either side from the horizontal ridge member at the apex of the roof to the exterior wall top plate, or beyond if an overhang is desired. The particular slope of these rafters is called the pitch of the roof. The pitch is demarcated by a set of numbers—the first number representing the rise or vertical component and the second number representing the run or horizontal component. The run is the horizontal distance measured at the midpoint, a point directly beneath the outer face of the ridge, to the outside edge of the exterior wall top plate. The rise is the vertical distance from a point on the ridge to the horizontal point even with the exterior top plate. Thus a 4/12 pitch has a slope with a 4 inch vertical rise for each 12 inches of horizontal run, while a 10/12 pitch is a much steeper roof, with a 10 inches of vertical rise for each 12 inches of horizontal run.

Where two roof slopes meet at an inside corner with the ridge members at right angles, a rafter known as a valley rafter runs from the junction point of the two ridge members to the junction point of the top plates. Valley jack rafters connect the ridge members to the valley rafter. When the endpoint of a ridge member is not directly above the end wall of a structure, a portion of the roof known as a hip roof will slope from the top of the wall to meet the ridge member. Rafters running from the end of the ridge member to each outside corner are known as a hip rafters. Hip jack rafters connect the hip rafters to the top plate.

The lengths of the common, hip, valley and jack rafters will vary depending on the particular pitch of the roof and on the overall width of the roof. To determine the correct length of a rafter, the Pythagorean theorem is used ($A^2 + B^2 = C^2$). For a right angle triangle, the length of the hypotenuse is equal to the square root of the sum of the sides squared. Thus, the length of a common rafter, which corresponds to the hypotenuse of the right angle triangle, is equal to the square root of the sum of the run squared and the rise squared, which correspond to the sides of the triangle. For hip rafters, valley rafters and jack rafters, the same mathematical concepts can be used to determine the correct length based on the rise and run values.

It has been discovered that for any given pitch, particular pitch factors can be determined which when multiplied times any particular run value give the correct length of a common, hip, valley or jack rafter. For example, for an 8/12 pitch, a common pitch factor of 1.201850 multiplied by the measured run value gives the correct length for the common rafters for that roof for any roof width. That same factor, 1.201850, will provide the correct length for the jack rafters when multiplied by the horizontal run distance corresponding to each jack rafter. For the same 8/12 pitch, a hip/valley pitch factor of 1.563471 multiplied by the same measured run value as the used for the common rafters produces the correct length for the hip or valley rafters for that roof for any roof width. As a comparative example, a 4/12 pitch roof will have a common pitch factor of 1.054092 and a hip/valley pitch factor of 1.452966, which when multiplied by the run value will provide the correct lengths for the particular rafters. Additionally, the rise distance for a given pitch value can be determined by multiplying the rise pitch factor by the run value. For an 8/12 pitch, the rise factor is 0.666667, and for a 4/12 pitch, the rise factor is 0.333333.

As shown in the figures, the preferred embodiment of the tape measure of the invention has four separate scales marked along the length of the tape 10. As shown in FIG. 1, the zero point of all four scales start at the same point at the free end of the tape. One scale, preferably located at the upper edge of the tape 10 as read from left to right, is the actual or true distance scale 11. This scale 11 is marked with indicia 20 consisting of lines of varying length and width, with numbers indicating the primary measurements. This true distance scale 11 is marked in feet, inches and fractions of inches, as found on a conventional measuring tape. This true distance scale 11 is used to measure the run value for a particular roof.

The other three scales are false distance scales having false distance indicia 30 corresponding in style, type and number to the true distance indicia 20 of true distance scale 11. One of the false distance scales is the rafter scale 12, used for determining lengths of common and jack rafters. An additional false distance scale is the hip/valley rafter scale 13, used for determining lengths of hip rafters and valley rafters. Preferably, the rafter scale 13 is located on the bottom edge of the tape 10, as it will be used more often than the hip/valley scale 13, which is preferably located in the middle of the tape 10. Still another false distance scale is the rise scale 14, which is used for determining the correct rise height. As indicated, the zero points of each false distance scale 12, 13 and 14 are even with the zero point of the true distance scale 11. The false distance indicia 30 for each false scale 12, 13 and 14 match the true distance indicia 20 for the true distance scale 11, but the actual distances between corresponding false indicia 30 will be greater or less on the false distance scales than true distances between the true distance indicia 20 on the true distance scale 11. In other words, the actual distance between the "feet", "inches" and "fractions" indicia 30 on the false distance scales 12, 13 and 14 will not be a true foot, inch or the appropriate fraction.

The positioning of the false indicia 30 on the false scales 12, 13 and 14 is determined by the particular roof pitch for which a given tape 10 applies. The distances between the false scale indicia 30 is the true distance multiplied by the common pitch factor for the rafter scale 12, by the hip/valley pitch factor for the hip/valley scale 13, and by the rise factor for the rise scale 14. Relating back to the examples given above, a roof pitch of 8/12 has a common pitch factor of 1.201850, a hip/valley pitch factor of 1.563471, and a rise factor of 0.666667. Thus the tape 10 for an 8/12 pitch roof has a rafter scale 12 where the false indicia 30 are separated by true distance times 1.201850. The one "inch" indicia 30 on the rafter scale 12 is actually 1.201850 inches from the zero point, the one "foot" indicia 30 is actually 1.201850 feet from the zero point, the five "foot" indicia 30 is actually 6.00925 feet from the zero point, etc. Correspondingly, the one "inch", one "foot" and five "foot" indicia 30 on the hip/valley scale are located 1.563471 inches, 1.563471 feet and 7.817355 feet, respectively, from the zero point, and the one "inch", one "foot" and five "foot" indicia 30 on the rise scale are located 0.666667 inches, 0.666667 feet and 3.333335 feet, respectively, from the zero point. For a tape for use with the 4/12 pitch roof, the rafter indicia 30 for one "inch", one "foot" and five "feet" are at 1.054092 inches, 1.054092 feet and 5.27046 feet, respectively, from the zero point, the hip/valley rafter indicia 30 for one "inch", one "foot" and five "feet" are at 1.452966 inches, 1.452966 feet and 7.26483 feet, respectively, from the zero point, and the rise scale indicia 30 for one "inch", one "foot" and five "feet" are at 0.333333 inches, 0.333333 feet and 1.666665 feet, respectively, from the zero point.

Figure 3:
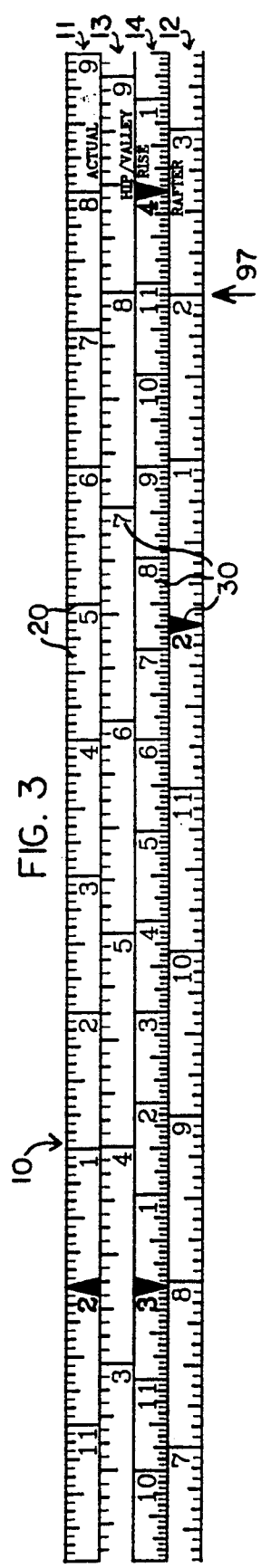
FIG. 3 is the next segment of the device immediately following the segment of FIG. 2.
Figure 4:
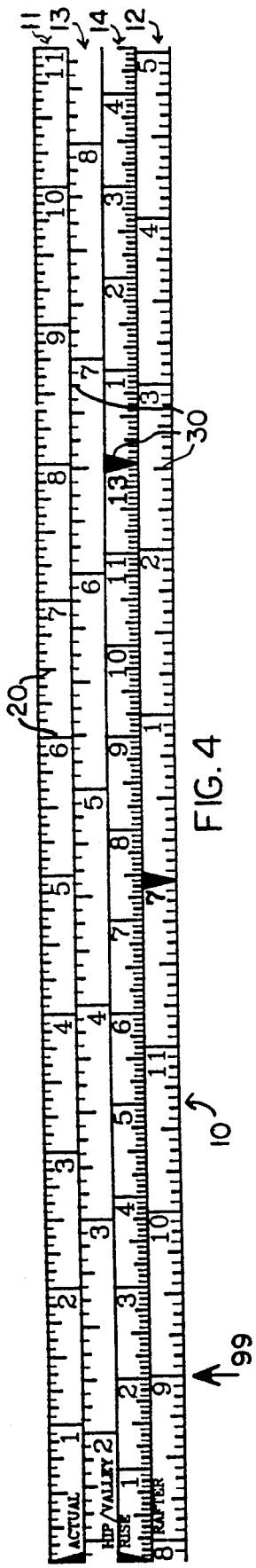
FIG. 4 is a portion of the device showing a segment of the device beginning 8 feet from the zero point.
Figure 5:
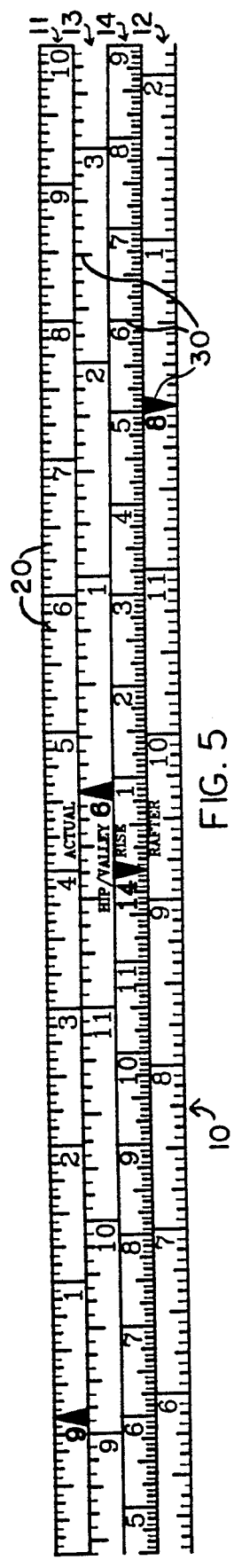
FIG. 5 is the next segment of the device immediately following the segment of FIG. 4.
Figure 6:
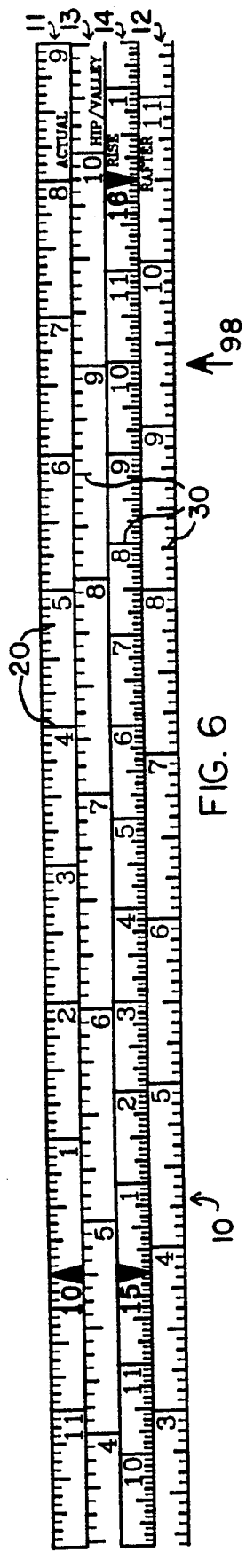
FIG. 6 is the next segment of the device immediately following the segment of FIG. 5.

The placement of the false distance indicia 30 allows the tape 10 to be used directly for marking rafter lengths to be cut without recourse to any calculations or manipulations. The user determines the run using the true distance indicia 20 on the true distance scale 11. Once this value is known, the user finds the corresponding false distance indicia 30 on the proper false scale and marks the board to be cut using that indicia. For example, using a tape 10 factored for an 8/12 pitch roof, if the run is a true distance of 6 feet, 9 inches, as measured on scale 11, to cut a common rafter the user simply goes to the rafter false distance scale 12, finds the corresponding false distance indicia 30 for 6 "feet", 9 "inches", as shown by arrow 99 in FIG. 4, and marks the board at this point for cutting. This distance is actually 8.112488 feet from the zero point, about 8 feet, 1 and ⅜ inches, and is the correct length for a common rafter for an 8/12 pitch with a run of 6 feet, 9 inches. Since the tape allows direct marking of the board to be cut, the true distance for the rafter need not be calculated. Likewise, to obtain the correct length for hip or valley rafters for the same roof, the user finds the 6 "feet", 9 "inches" false indicia 30 on the hip/valley false distance scale 13 and marks the board to be cut at this point. In actuality, this distance is 10.553429 feet from the zero point, about 10 feet, 6 and ⅜ inches, and is illustrated by arrow 98 in FIG. 6. Again no computations or manipulations are required by the user, and the correct length rafter is obtained by direct application of a single tool. To determine the correct rise distance for the same roof, the user finds the 6 "feet", 9 "inches" false indicia 30 on the rise scale 14. In actuality, this distance is 5.0625 feet from the zero point, about 5 feet, ¾ inches, and when added to the heel height for the particular rafter member will provide the true rise height to the top of the ridge member. To determine the correct lengths for jack rafters, which unlike the common rafters will vary in length depending upon their location along the hip rafter or the valley rafter, the horizontal run distance under each particular jack rafter is measured on the true distance scale 11. For example, for a jack rafter on an 8/12 pitch roof having a run distance of 2 feet, 2 inches, the corresponding 2 "feet", 2 "inches" false distance indicia 30 is located on the rafter scale 12, and this length is marked on the board to be cut. As shown by arrow 97 in FIG. 3, the actual distance is 2.604009 feet from the zero point, about 2 feet, 7 and ¼ inches. The same technique is employed for any run distance, and with the appropriate tape 10 having the proper pitch factors, for any roof pitch.

It will be understood that those skilled in the art may realize obvious equivalents for substitutions for components set forth above, and the above illustrations are by way of example only. The true scope and definition of the invention therefore is to be as set forth in the following claims.

I claim:

1. A measuring tape for use with roof framing members for direct marking of rafter lengths for a particular pitch based on measurement of a particular run distance, said measuring tape comprising a plural number of scales having a common zero point, one of said scales being a true distance scale having true distance indicia, and one or more additional said scales being secondary false distance scales having false distance indicia means for directly marking rafter lengths without need of calculation, said false distance indicia means corresponding to said true distance indicia, where the distances of said false distance indicia means from said zero point on said tape equal the corresponding distances of said true distance indicia multiplied by a predetermined pitch factor based on said particular pitch.

2. The device of claim 1, where one of said false distance scales has said false distance indicia means for direct marking of common and jack rafters.

3. The device of claim 2, where another of said false distance scales has another of said false distance indicia means for direct marking of hip and valley rafters.

4. The device of claim 3, where another of said false distance scales has another of said false distance indicia means for direct marking of rise distance.

5. The device of claim 1, where one of said false distance scales has said false distance indicia means for direct marking of hip and valley rafters.

6. The device of claim 1, where one of said false distance scales has said false distance indicia means for direct marking of rise distance.

7. The device of claim 1, where said true distance indicia comprise numbers and lines indicating feet, inches and fractions of inches.

* * * * *